United States Patent [19]

Johnson

[11] 4,362,512

[45] Dec. 7, 1982

[54] ELECTRIC OUTBOARD MOTOR CONSTRUCTION

[75] Inventor: Wallace R. Johnson, Mundelein, Ill.

[73] Assignee: Outboard Marine Corporation, Waukegan, Ill.

[21] Appl. No.: 190,588

[22] Filed: Sep. 25, 1980

[51] Int. Cl.³ ............................................ B63H 21/26
[52] U.S. Cl. .......................................... 440/6; 318/473
[58] Field of Search .................... 440/6, 7; 310/87, 89, 310/68 C; 318/473, 472, 471; 361/25, 26, 27

[56] References Cited

U.S. PATENT DOCUMENTS

| | | | |
|---|---|---|---|
| 2,808,238 | 10/1957 | Spitler | 310/87 X |
| 3,593,050 | 7/1971 | Ware | 440/6 |
| 4,075,970 | 2/1978 | Blake et al. | 440/6 |

Primary Examiner—Sherman D. Basinger
Attorney, Agent, or Firm—Michael, Best & Friedrich

[57] ABSTRACT

Disclosed herein is an outboard motor having a control circuit for a permanent magnet, direct current motor, which circuit comprises a source of direct current, a permanent magnet motor including an armature winding having opposed terminals, control means including a first resistor connected between one of the armature winding terminals and the direct current source, a second resistor connected to the one armature winding terminal, a shunt lead connected to the one armature winding terminal, and a speed control switch connected to the direct current source and selectively operable between a first position connecting the direct current source to the shunt lead in parallel with the first resistor and disconnected from the second resistor, a second position connecting the direct current source to the second resistor in parallel with the first resistor and disconnected from the shunt lead, and a third position disconnected from both of the shunt lead and the second resistor, whereby current flow from the current source to the armature winding is solely through the first resistor, and a thermal cut-out switch connected between the one armature winding terminal and the first and second resistors.

8 Claims, 2 Drawing Figures

ELECTRIC OUTBOARD MOTOR CONSTRUCTION

RELATED APPLICATION

Attention is directed to U.S. Pat. No. 4,296,363, granted Oct. 20, 1981 and entitled "Speed Regulator for a Direct Current Permanent Magnet Motor."

BACKGROUND OF THE INVENTION

The invention relates generally to outboard motors and more particularly to outboard motors including electric motors. Still further, the invention relates to speed control circuits for outboard motors driven by permanent magnet electric motors.

The invention also relates to the control of direct current permanent magnet motors and to arrangement for dissipating heat from such motors.

Attention is directed to the Ware U.S. Pat. No. 3,593,050 issued July 13, 1971; to the Green U.S. Pat. No. 2,975,349 issued Mar. 14, 1961; to the Coburn U.S. Pat. No. 2,554,440 issued May 22, 1951; to the Person U.S. Pat. No. 3,541,489 issued Nov. 17, 1970; to the Blake U.S. Pat. No. 4,075,970 issued Feb. 28, 1978; and to the Blake U.S. Pat. No. 3,954,081 issued May 4, 1976.

SUMMARY OF THE INVENTION

The invention provides an outboard motor comprising a shaft having a lower end and a hollow interior, means for connecting the shaft to a boat with the shaft extending in a generally vertical direction, a housing including a motor section incorporating an electric motor, an adaptor section connected to the shaft lower end, and including an interior recess communicating with the hollow interior of the shaft, located in axially spaced relation from the motor, and being defined by a radial surface, a bore extending from the radial surface, and a counterbore extending from the bore, and means for connecting together the motor housing section and the adaptor section, a winding assembly located in the bore and comprising a bobbin having an outer surface, an inner surface, and spaced first and second ends, and a winding located on the outer bobbin surface and having a dimension affording a close fit with the bore, a member interfitting with the inner surface of the bobbin and having a radially outwardly extending flange which projects over the first end of the bobbin and into the counterbore, and a compressible member sandwiched between the flange and the motor housing section and compressed consequent to connection of the motor section to the adaptor section, whereby to force the flange against the first end of the bobbin so as to seat the second end of the bobbin tightly against the radial surface of the housing.

In one embodiment of the invention, the member is cylindrical and also includes an inwardly located terminal block.

The invention also provides a control circuit for a permanent magnet, direct current motor incorporated in an outboard motor, which circuit comprises a source of direct current, a permanent magnet motor including an armature winding having opposed terminals, control means including a first resistor connected between one of the armature winding terminals and the direct current source, a second resistor connected to the one armature winding terminal, a shunt lead connected to the one armature winding terminal, and a speed control switch connected to the direct current source and selectively operable between a first position connecting the direct current source to the shunt lead in parallel with the first resistor and disconnected from the second resistor, a second position connecting the direct current source to the second resistor in parallel with the first resistor and disconnected from the shunt lead, and a third position disconnected from both of the shunt lead and the second resistor, whereby current flow from the current source to the armature winding is solely through the first resistor, and a thermal cut-out switch connected between the one armature winding terminal and one of the resistors.

In one embodiment of the invention, the speed control switch and the first resistor are connected to the direct current source through an off-on switch.

In one embodiment in accordance with the invention, the first and second resistors constitute a single winding having a center tap and the thermal switch is connected to the tap.

Other features and advantages of the embodiments of the invention will become known by reference to the following drawings, general description, and claims.

THE DRAWINGS

Figure 1:
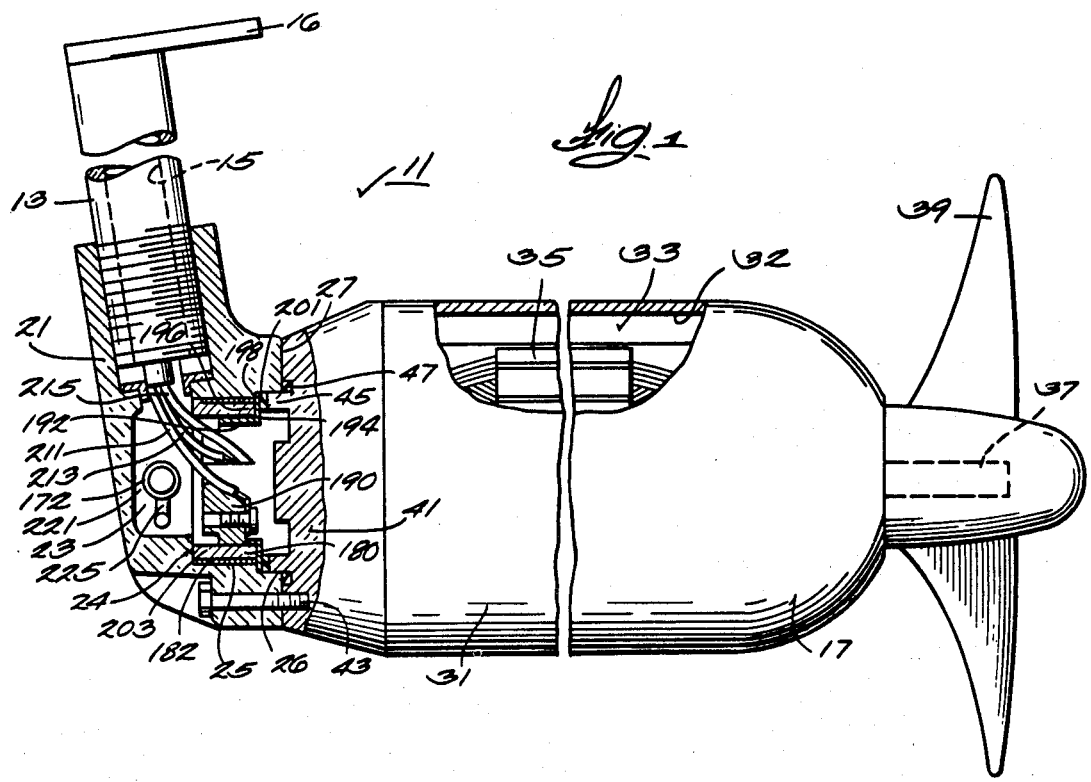
FIG. 1 is a fragmentary, partially schematic, side elevational view, partially broken away and in section, of an outboard motor embodying various of the features of the invention.

Before explaining one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for purpose of description and should not be regarded as limiting.

GENERAL DESCRIPTION

Shown in FIG. 1 of the drawings is an outboard motor 11 which includes a shaft or strut 13 having a hollow interior 15 and which is carried for steering movement about an axis extending lengthwise of the shaft 13 under normal operating conditions and for tilting movement about a horizontal axis by any suitable means 16 (shown schematically) such as disclosed in the Shimanckas U.S. Pat. No. 3,870,258 issued Mar. 11, 1975 and incorporated herein by reference.

At its lower end, the shaft 13 is suitably connected, as by a screw thread connection or otherwise, to an underwater housing 17 which includes an adapter housing member 21 which is fabricated of aluminum and which has a rearwardly open cavity or recess 23 communicating with the hollow interior 15 of the shaft 13. The recess 23 includes an radially extending annular surface 24, together with first and second rearwardly open counterbores 25 and 26. The adapter housing member 21 includes a rearwardly facing surface 27 extending from the outer or rearward end of the second counterbore 26.

Connected to the rearward surface 27 of the adapter housing member 21 is a motor housing member 31 including a hollow interior cavity or chamber 32 which contains and supports a direct current motor 33 including an armature winding 35 and an output shaft 37 which can extend rearwardly from the motor housing means 31 and can have a propeller 39 mounted thereon for rotation in common with the output shaft 37. The motor housing member 31 also includes, forwardly of the electric motor 33, a transverse wall or partition 41 which separates the recess 23 from the cavity 32. The motor housing member 31 can be connected to the adapter housing member 21 in any suitable fashion, and, in the disclosed construction, is connected by a plurality of bolts 43 which extend through portions of the adapter housing member 21 and are threaded into the motor housing member 31.

The counterbore 26 serves as a pilot and, preferably, the motor housing member 31 includes a pilot projection 45 which is received in the pilot counterbore 26 to properly locate the motor housing member 31 relative to the adapter housing member 21. A seal 47 in the form of an O-ring is also provided to prevent entry of water into the adapter recess or cavity 23 or into the chamber or cavity 32 of the motor housing member 31. Contained in the adaptor recess or cavity 23 is a portion of a motor control circuit shown in FIG. 2.

Figure 2:
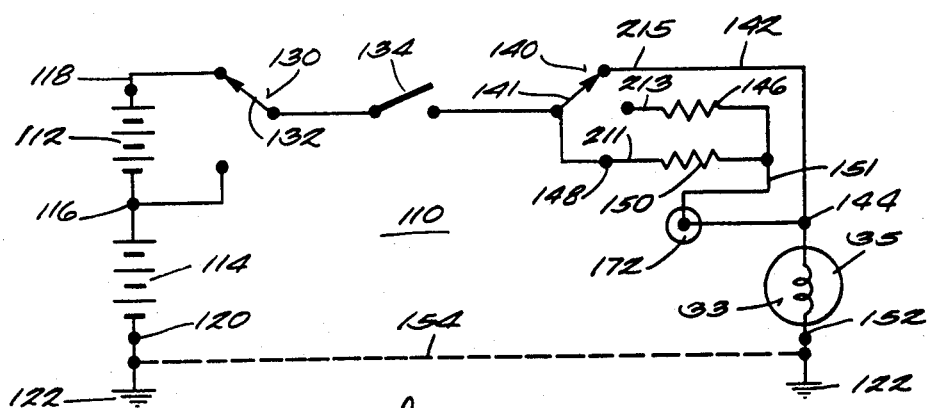
FIG. 2 is a schematic wiring diagram of one speed control circuit embodying various of the features of the invention.

Shown in FIG. 2 is one embodiment of a motor control circuit 110 adapted to provide either 12 or 24 volt potential and which is adapted to automatically open the control circuit 110 to prevent motor operation in the event of overheating of the housing 17. The control circuit 110 includes a pair of serially connected 12 volt batteries 112 or 114 having a mutually connected intermediate terminal 116, a positive terminal 118 and a negative terminal 120 connected to ground 122. Included in the circuit 110 is a battery control switch 130 having a contact or member 132 which is movable between two spaced positions, and which is alternatively connectable to the positive terminal 118 and to the intermediate terminal 116 of the series connected batteries 112 and 114. Thus, when the contact 132 is connected with positive terminal 118, 24 volt potential is available. When the contact 132 is connected with intermediate terminal 116, 12 volt potential is available.

The battery control switch 130 is electrically connected, through an off-on switch 134 which can be an ignition switch or a foot switch, to a motor control switch 140 which, in conjunction with the battery control switch 130, controls the voltage applied to the terminals of the armature winding 35 in the motor 33.

The motor control switch 140 includes a movable contact or member 141 adapted to be selectively coupled to a shunt lead 142 connected to one motor terminal 144, and to a resistor 146 which is connected in parallel with the shunt lead 142 to the motor terminal 144, and to a terminal 148 which is connected to the off-on switch 134 in parallel with the motor control switch 140 and to a shunt resistor 150 which is connected to the motor terminal 144. The other motor terminal 152 is connected to ground 122. If desired, a lead 154 (shown in dotted outline) can be employed between the motor terminal 152 and the negative battery terminal 120 to provide a closed circuit configuration.

As will be explained hereinafter, the resistors 146 and 150 constitute a single winding having a center tap 151 (See FIG. 2) which is connected to the armature winding terminal 144 in parallel with the lead 142.

Thus, when the motor control switch 140 is connected to the shunt lead 142, the motor 33 is subject to the potential provided by the battery control switch 130. When the motor control switch 140 is connected to the resistor 146, the motor 33 is subject to the potential provided by the battery control switch 130 modified by the voltage drop occurring in response to the parallel connection of the resistors 146 and 150. When the motor control switch 140 is connected to the terminal 148, the motor is subject to the potential provided by the battery control switch 130 modified by the voltage drop occurring across the resistor 150. Thus, the motor control switch 140 provides for motor operation at six different voltages, i.e., at three different voltage levels for each position of the battery control switch 130. If desired, the motor control switch 140 could be arranged so as to locate the switch in an electrically unconnected position with the same result as connection to the terminal 148.

If desired, additional resistors could be arranged for selective connection by the motor control switch 140 to provide motor operation at additional potentials.

While the motor control switch is illustrated in FIG. 2 as being connected to the positive battery terminal 118, the circuit 110 could be rearranged so that the motor control switch 140 and resistor 150 are connected to the negative battery terminal 120 in a closed circuit configuration.

In order to prevent such heating of the housing 17 as could burn the skin of a user in the event the housing 17 is out of water and came into contact with skin, the control circuit 110 further includes a thermal cut-off switch 172 located in the recess 23 in the housing 17, and connected between the center tap 151 and the terminal 144 of the armature winding 35 in parallel with connection of the lead 142. Thus, if the temperature of the housing 17 rises above a pre-selected limit, the switch 172 will open preventing further motor operation until the temperature drops below the pre-determined level. It is noted that the thermal switch 172 is operative during energizing of the motor 35 through one or both of the resistors 146 and 150 but is inoperative when the motor 35 is energized through the shunt lead 142.

The thermal cut-off switch 172 is located in an innermost portion 221 of the recess 23 and is held in engagement with a surface of the housing 17 defining the innermost recess portion 221 by any suitable clamp means 225 (shown schematically).

In order to maximize heat dissipation, the resistors 146 and 150, as already indicated, are wound on a single bobbin 180 as a single winding 182 having the center tap 151 which extends through a radial bore (not shown) in the bobbin 180, and which is connected to the armature winding terminal 144. The winding 182 is of copper wire coated with a high temperature insulation and the bobbin 180 is an aluminum sleeve or other good heat conducting component. The bobbin and winding assembly are dimensioned such as to permit insertion of the bobbin and winding assembly into the first counterbore 25 with the winding 182 located in closely adjacent relation to the annular surface of the first counterbore 25.

Means are provided for retaining the bobbin and winding assembly in the first counterbore 25 and for providing a terminal block 190. While various construction can be employed in the illustrated construction, such means comprises a cylindrical member 192 which is preferably fabricated from aluminum, which has an outer surface closely interfitting within the inner surface of the bobbin 180, and which, at one end, has a radially outwardly extending flange 194. The flange 194 extends over the adjacent end 196 of the bobbin 180 and into the second counterbore 26 between the annular shoulder 198 formed between the first and second counterbores 25 and 26 and the adjacent end of the pilot projection 45.

Located between the end of the pilot projection 45 and the flange 194 is a compressible rubber washer 201 which, during tightening of the bolts 43, presses the flange 194 against the adjacent end 196 of the bobbin 180 so as to tightly seal the other end 203 of the bobbin 180 against the annular shoulder 24 at the end of the first counterbore 25, and thus providing a good heat transfer path or connection between the aluminum bobbin 180 and the aluminum housing 17. Accordingly, heat from the winding 182 forming both resistors 146 and 150 is transferred directly to the housing 17 from the winding 182 and from the winding 182 to the bobbin 180 and thence to the housing 17 through the engagement of the end 203 of the bobbin 180 with the annular shoulder 24. It is particularly noted that the thermal cut-out switch 172 is located adjacent to the radial surface 24 through which heat flows from the bobbin 180 to the adaptor housing member or section 21.

The cylindrical member 182 is also inwardly formed with the terminal block 190 to which the center tap 151 and end taps of the winding 182 are connected, to which the three leads 211, 213 and 215 (See FIG. 1) in the hollow interior 15 of the shaft 13 can be connected, and to which the motor terminals 144 and 152 can be connected so as to complete the circuit 110.

The three leads extending into the shaft 13 are also identified in FIG. 2, it being understood that the speed control switch 140 is located outside of and above the housing 17 for accessibility by the user of the outboard motor 11.

Various of the features of the invention are set forth in the following claims.

I claim:

1. An outboard motor comprising a shaft having a lower end and a hollow interior, means for connecting said shaft to a boat with said shaft extending in a generally vertical direction, a housing including a motor section incorporating an electric motor and supporting a propeller, an adaptor section connected to said shaft lower end and including an interior recess communicating with said hollow interior of said shaft, located in axially spaced relation from said motor, and being defined by a radial surface, a bore extending from said radial surface, and a counterbore extending from said bore, and means for connecting together said motor housing section and said adaptor section, a winding assembly located in said bore and comprising a bobbin having an outer surface, an inner surface, and spaced first and second ends, and a winding location on said outer bobbin surface and having a dimension affording a close fit with said bore, a member interfitting with said inner surface of said bobbin and having a radially outwardly extending flange which projects over said first end of said bobbin and into said counterbore, and a compressible member sandwiched between said flange and said motor housing section and compressed consequent to connection of said motor section to said adaptor section, whereby to force said flange against said first end of said bobbin so as to seat said second end of said bobbin tightly against said radial surface of said housing.

2. An outboard motor in accordance with claim 1 wherein said member is cylindrical and also includes an inwardly located terminal block.

3. A control circuit for a permanent magnet, direct current motor incorporated in an outboard motor, said circuit comprising a source of direct current, a permanent magnet motor including an armature winding having opposed terminals, and control means including a first resistor connected to said direct current source, a second resistor, a thermal cut-out switch connected between said one armature winding terminal and each of said first and second resistors, a shunt lead connected to said one armature winding terminal independently of said thermal cut-out switch, and a speed control switch connected to said direct current source and selectively operable between a first position connecting said direct current source to said shunt lead in parallel with said first resistor and disconnected from said second resistor, a second position connecting said direct current source to said second resistor in parallel with said first resistor and disconnected from said shunt lead, and a third position disconnected from both of said shunt lead and said second resistor.

4. A control circuit in accordance with claim 3 wherein said speed control switch and said first resistor are connected to said direct current source through an off-on switch.

5. A control circuit for a permanent magnet, direct current motor incorporated in an outboard motor, said circuit comprising a source of direct current, a permanent magnet motor including an armature winding having opposed terminals, control means including a first resistor connected to said direct current source, a second resistor, said first and second resistors constituting a single winding having a center tap, a shunt lead connected to said one armature winding terminal, and a speed control switch connected to said direct current source and selectively operable between a first position connecting said direct current source to said shunt lead in parallel with said first resistor and disconnected from said second resistor, a second position connecting said direct current source to said second resistor in parallel with said first resistor and disconnected from said shunt lead, and a third position disconnected from both of said shunt lead and said second resistor, and a thermal cut-out switch connected between said one armature winding terminal and said tap.

6. A control circuit for a permanent magnet, direct current motor incorporated in an outboard motor, said circuit comprising a source of direct current, a permanent magnet motor including an armature winding having a terminal, and control means including a first resistor connected to one of said armature winding terminal and said direct current source, a second resistor, a thermal cut-out switch connected to both of said first and second resistors and to the other of said armature winding terminal and said direct current source, a shunt lead connected to said other of said armature winding terminal and said direct current source independently of said thermal cut-out switch, and a speed control switch connected to said one of said armature winding terminal and said direct current source and selectively operable between a first position connecting said one of said armature winding terminal and said direct current source to said shunt lead in parallel with said first resistor and disconnected from said second resistor, a second position connecting said one of said armature winding terminal and said direct current source to said second resistor in parallel with said first resistor and disconnected from said shunt lead, and a third position disconnected from both of said shunt lead and said second resistor, whereby current flow from said current source to said armature winding is solely through said first resistor.

7. A control circuit in accordance with claim 6 wherein said speed control switch and said first resistor are connected between said direct current source and said one armature winding through an off-on switch.

8. A control circuit for a permanent magnet, direct current motor incorporated in an outboard motor, said circuit comprising a source of direct current, a permanent magnet motor including an armature winding having a terminal, and control means including a first resistor connected to one of said armature winding terminal and said direct current source, a second resistor, said first and second resistors constituting a single winding having a center tap, a thermal cut-out switch connected between said center tap and the other of said armature winding terminal and said direct current source, a shunt lead connected to said other of said armature winding terminal and said direct current source, and a speed control switch connected to said one of said armature winding terminal and said direct current source and selectively operable between a first position connecting said one of said armature winding terminal and said direct current source to said shunt lead in parallel with said first resistor and disconnected from said second resistor, a second position connecting said one of said armature winding terminal and said direct current source to said second resistor in parallel with said first resistor and disconnected for said shunt lead, and a third position disconnected from both of said shunt lead and said second resistor.

* * * * *

UNITED STATES PATENT AND TRADEMARK OFFICE
CERTIFICATE OF CORRECTION

PATENT NO. : 4,362,512
DATED : December 7, 1982
INVENTOR(S) : Wallace R. Johnson It is certified that error appears in the above-identified patent and that said Letters Patent are hereby corrected as shown below:

Column 5, line 26, delete "182", insert -- 192 --.

Column 5, line 56, delete "location", insert -- located --.

Column 8, line 15, delete "for", insert -- from --.

Signed and Sealed this

Nineteenth Day of February 1985

[SEAL]

Attest:

DONALD J. QUIGG

Attesting Officer   Acting Commissioner of Patents and Trademarks